United States Patent
Tsuchiya (10) Patent No.: US 11,297,019 B2
(45) Date of Patent: Apr. 5, 2022

(54) MESSAGE NOTIFICATION DEVICE, CONTENT MANAGEMENT SYSTEM, AND NON-TRANSITORY COMPUTER READABLE MEDIUM

(71) Applicant: FUJIFILM BUSINESS INNOVATION CORP., Tokyo (JP)

(72) Inventor: Takaki Tsuchiya, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 0 days.

(21) Appl. No.: 16/533,164

(22) Filed: Aug. 6, 2019

(65) Prior Publication Data

US 2020/0296060 A1  Sep. 17, 2020

(30) Foreign Application Priority Data

Mar. 14, 2019 (JP) .............................. JP2019-046968

(51) Int. Cl.
*H04L 12/58* (2006.01)
*H04L 51/046* (2022.01)
*H04L 51/234* (2022.01)
*H04L 51/224* (2022.01)
*H04L 51/08* (2022.01)

(52) U.S. Cl.
CPC ............ *H04L 51/046* (2013.01); *H04L 51/08* (2013.01); *H04L 51/24* (2013.01); *H04L 51/34* (2013.01)

(58) Field of Classification Search
CPC ....... H04L 51/046; H04L 51/08; H04L 45/66; H04L 47/125; H04L 45/64; H04L 51/34; H04L 51/24; G06F 9/45558; G06F 2009/45595

See application file for complete search history.

(56) References Cited

U.S. PATENT DOCUMENTS

| 5,842,216 A * | 11/1998 | Anderson ............. H04L 1/1678 |
| 6,128,652 A * | 10/2000 | Toh ...................... H04N 21/237 709/217 |
| 10,218,660 B2 * | 2/2019 | Schneider ........... G06F 3/04883 |
| 2019/0272559 A1 * | 9/2019 | Lee ......................... G06F 40/30 |

FOREIGN PATENT DOCUMENTS

JP    2014-241113 A    12/2014

\* cited by examiner

*Primary Examiner* — Philip C Lee
(74) *Attorney, Agent, or Firm* — Oliff PLC (57) ABSTRACT

A message notification device includes an update information acquisition unit and a notification unit. The update information acquisition unit is configured to, when information that uniquely specifies content is contained in a message, acquire update information as to whether or not the uniquely specified content is updated. The notification unit is configured to notify a poster who has posted the message when the update information is acquired by the update information acquisition unit.

9 Claims, 15 Drawing Sheets

FIG. 1

CONTENT MANAGEMENT SYSTEM 10

| MESSAGE IDENTIFIER | POSTING DESTINATION | POSTER | POSTING DATE AND TIME | POSTING MESSAGE |
|---|---|---|---|---|
| M0000 | DEVELOPMENT GROUP A | USER A | 2018/12/01 14:00:00 | SHARE THE DOCUMENT. https://xxx.co.jp/Contents/0000 ACCORDING TO THE DOCUMENT... |
| M0001 | DEVELOPMENT GROUP B | USER C | 2018/12/01 14:10:00 | UPLOAD PROCEEDING OF LAST MEETING TO DESIGNATED LOCATION. |
| M0002 | DEVELOPMENT GROUP A | USER B | 2018/12/01 14:15:00 | THANK YOU FOR SHARING THE DOCUMENT. |

FIG. 5

| CONTENT IDENTIFIER | FILE NAME | REGISTRATION DATE AND TIME | UPDATE DATE AND TIME | URL |
|---|---|---|---|---|
| 0000 | DOCUMENT FILE 1 | 2018/12/01 10:00:00 | 2018/12/03 11:30:00 | https://xxx.co.jp/Contents/0000 |
| 0001 | DRAWING A | 2018/12/01 10:05:00 | 2018/12/02 15:00:00 | https://xxx.co.jp/Contents/0001 |
| 0002 | DOCUMENT FILE 2 | 2018/12/01 10:20:00 | 2018/12/01 10:20:00 | https://xxx.co.jp/Contents/0002 |

SHARE THE DOCUMENT.
https://xxx.co.jp/Contents/0000
ACCORDING TO THE DOCUMENT, COMPATIBLE MODELS ARE:
• AAA
• BBB.

MR. B

THANK YOU FOR SHARING THE DOCUMENT.

SHARE THE DOCUMENT.
~~https://xxx.co.jp/Contents/0000~~
https://xxx.co.jp/Contents/0001
ACCORDING TO THE DOCUMENT, COMPATIBLE MODELS ARE:
• AAA
• BBB.

MR. B

THANK YOU FOR SHARING THE DOCUMENT.

MESSAGE NOTIFICATION DEVICE, CONTENT MANAGEMENT SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-046968 filed Mar. 14, 2019.

BACKGROUND

1. Technical Field

The present disclosure relates to a message notification device, a content management system, and a non-transitory computer readable medium.

2. Related Art

JP-A-2014-241113 discloses a content management device that includes a deletion request transmission unit configured to transmit, to a post management service, a deletion request for posting information related to content posted to the post management service, a response information reception unit configured to receive, from the post management service, response information indicating that the posting information is deleted successfully in accordance with the deletion request, and a content deletion unit configured to delete the content stored in a storage unit when the response information reception unit receives the response information.

SUMMARY

Aspects of non-limiting embodiments of the present disclosure relate to a message notification device, a content management system, and a non-transitory computer readable medium which can inform an update of content when the content is updated, in a case where information that uniquely specifies the content is contained in a message.

Here, the term "message" refers to a text-based post. The term "content" refers to content of information and includes various formats such as a video, audio, a document (including a text, a drawing, and an image).

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a message notification device including: an update information acquisition unit configured to, when information that uniquely specifies content is contained in a message, acquire update information as to whether or not the uniquely specified content is updated; and a notification unit configured to notify a poster who has posted the message when the update information is acquired by the update information acquisition unit.

BRIEF DESCRIPTION OF THE DRAWINGS

Exemplary embodiment(s) of the present disclosure will be described in detail based on the following figures, wherein.

DETAILED DESCRIPTION

Next, exemplary embodiments of the present disclosure will be described in detail with reference to the drawings.

Figure 1:
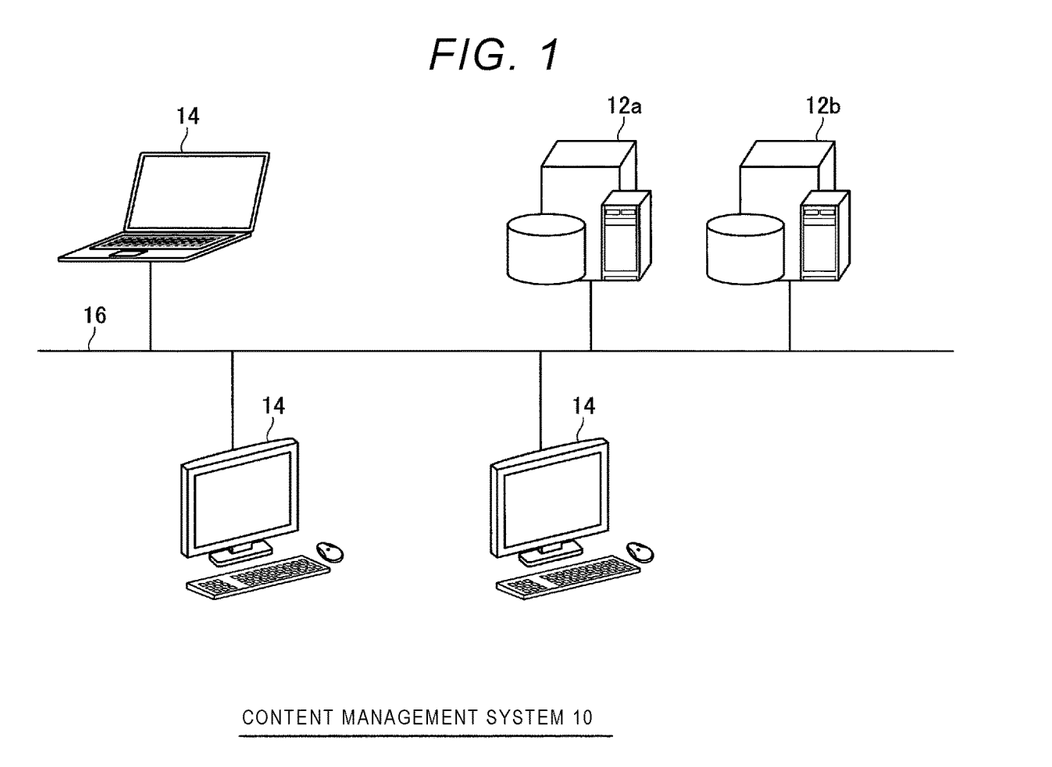
FIG. 1 is a configuration diagram showing a content management system according to an exemplary embodiment of the present disclosure.

FIG. 1 shows a content management system 10 according to an exemplary embodiment of the present disclosure.

The content management system 10 includes, for example, two servers 12a and 12b and plural client terminals 14, and the servers 12a and 12b and the client terminals 14 are connected to each other via a network 16. The client terminal 14 is a personal computer or a mobile terminal. The network 16 may be a local area network or the Internet.

Figure 2:
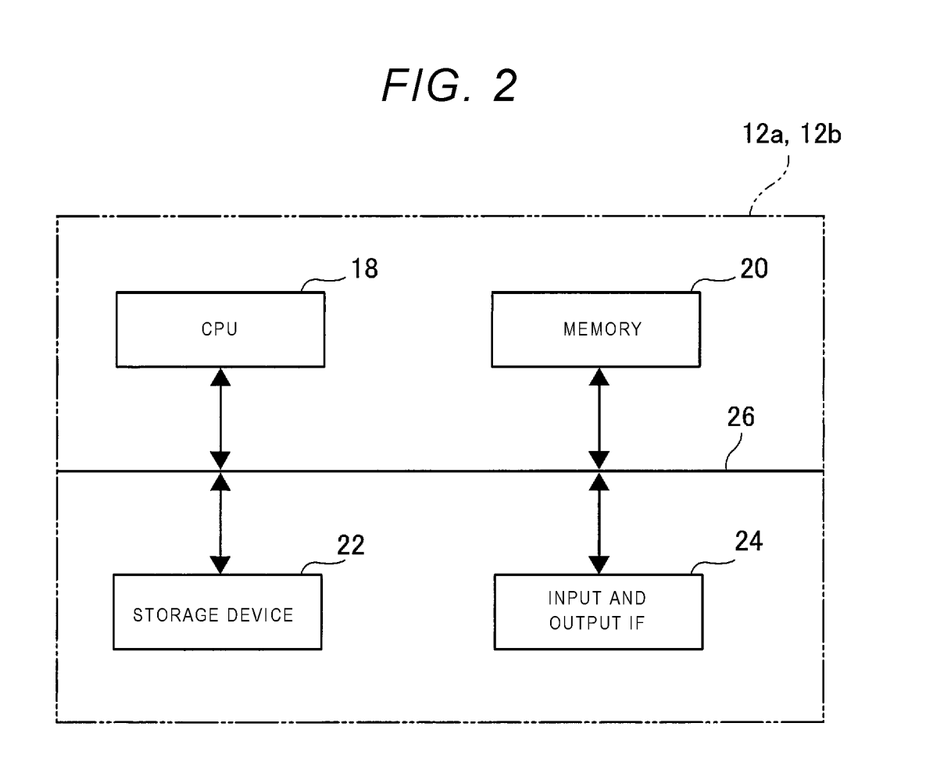
FIG. 2 is a block diagram showing a server used in the exemplary embodiment of the present disclosure.

FIG. 2 is a block diagram showing hardware of the servers 12a and 12b.

The servers 12a and 12b each includes a CPU 18, a memory 20, a storage device 22, and an input and output interface 24, and the CPU 18, the memory 20, the storage device 22, and the input and output interface 24 are connected to each other via a bus 26.

The CPU 18 executes a predetermined process based on a control program stored in the memory 20. The storage device 22 includes, for example, a hard disk, and stores required software and data. Data is input and output to and from the input and output interface 24 via the network 16.

Figure 3:
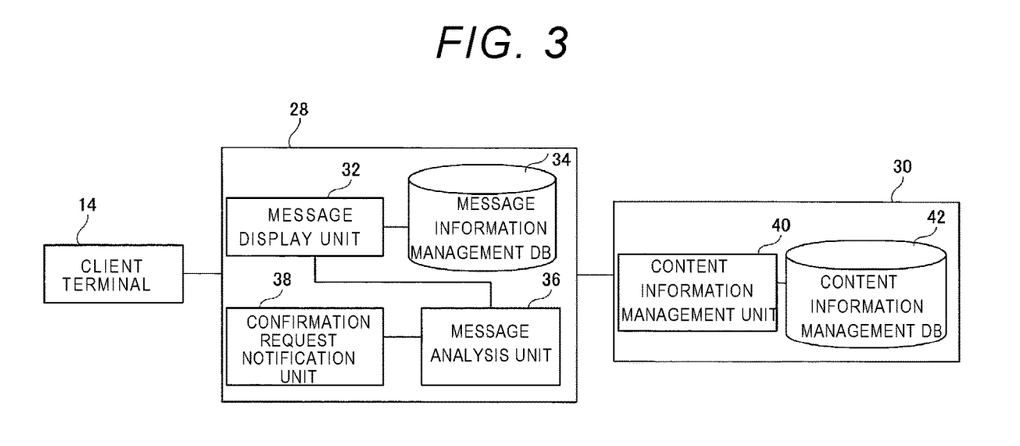
FIG. 3 is a block diagram showing a functional configuration of the content management system according to the exemplary embodiment of the present disclosure.

FIG. 3 is a block diagram showing a functional configuration of the content management system 10.

The content management system 10 includes a message notification device 28 and a content management device 30 in addition to the client terminal 14.

The message notification device 28 is, for example, provided in the server 12a, receives a message posting request from a user, and notifies a message containing specified content to a specified posting destination. Another user or a user group may be specified as a message posting destination.

The message notification device 28 includes a message display unit 32, a message information management database 34, a message analysis unit 36, and a confirmation request notification unit 38.

The message display unit 32 receives a request from the client terminal 14 and executes a process. For example, when a posting request is received from the client terminal 14, specified message information is recorded in the message information management database 34. Further, when an update request is received from the client terminal 14, the message recorded in the message information management database 34 is updated. When a message viewing request is made, the message information is acquired from the message information management database 34, and the message analysis unit 36 is notified of (i) content of a message and (ii) a posting date and time of the message. Further, a message display is changed in accordance with a response from the message analysis unit 36, and screen information is transmitted to the client terminal 14.

Figure 4:
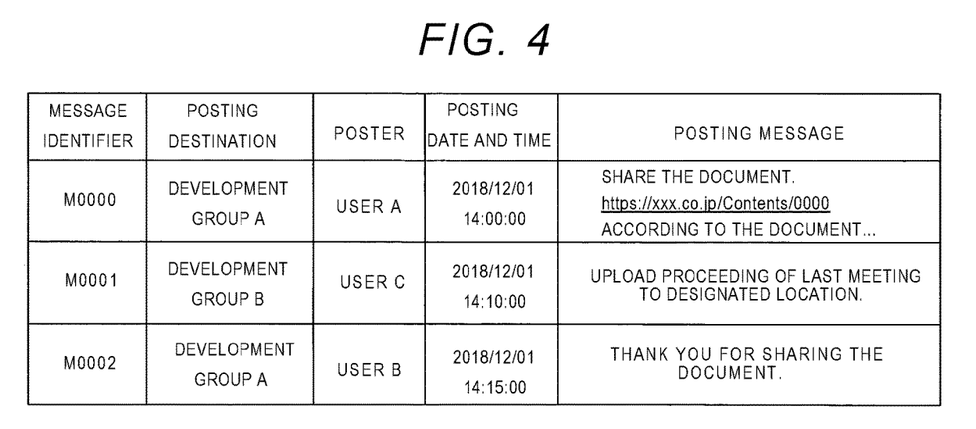
FIG. 4 is a table showing information stored in a message information management database in the content management system according to the exemplary embodiment of the present disclosure.

The message information management database 34 manages information on messages. Specifically, as shown in FIG. 4, a message identifier is allocated to each message, and a posting destination, a poster, a posting date and time, a content of a posting message, and the like are stored.

The message analysis unit 36 receives a request for analyzing content of a message from the message display unit 32, and analyzes whether or not information for uniquely specifying content, for example, link information to the content management device 30 (for example, URL. URL is an abbreviation for uniform resource locator, and is an address of a file on the network) is contained in the message. When an update date and time of the content is later than the posting date and time of the message, the message display unit 32 is notified that old link information is contained. In addition, the confirmation request notification unit 38 is notified to notify the poster who has posted the message including the old link information, of a request for confirming a message (that is, a confirmation request).

The confirmation request notification unit 38 receives a notification from the message analysis unit 36, and transmits a notification for requesting confirmation of the message to the message poster.

The content management device 30 includes a content information management unit 40 and a content information management database 42.

The content information management unit 40 has a function of receiving a request for registration, acquisition, update, or deletion of content from a user, and acquiring and updating information in the content information management database 42.

Figure 5:
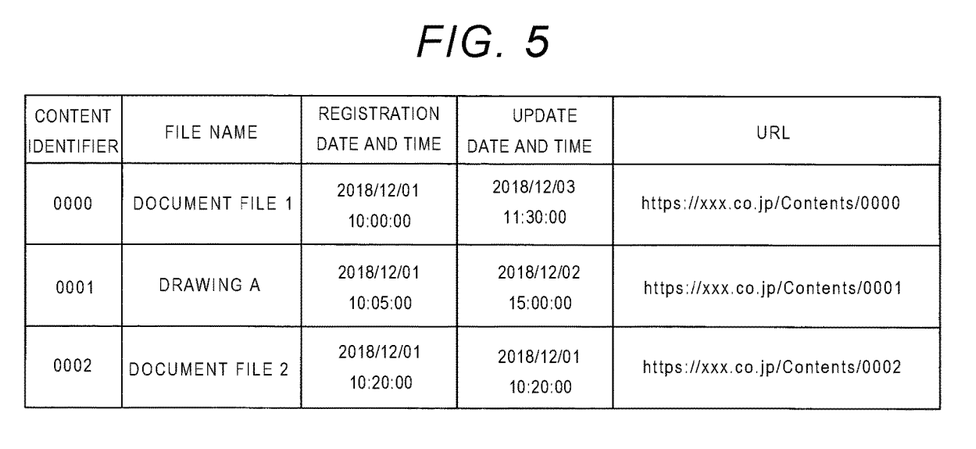
FIG. 5 is a table showing information stored in a content information management database in the content management system according to the exemplary embodiment of the present disclosure.

The content information management database 42 manages information on content (that is, content information). Specifically, as shown in FIG. 5, a content identifier is allocated to each content, and a file name, a registration date and time, an update date and time, a URL, and the like are stored.

Next, the exemplary embodiment will be described in more detail with reference to flowcharts shown in FIGS. 6A to 10B.

Figure 6A:
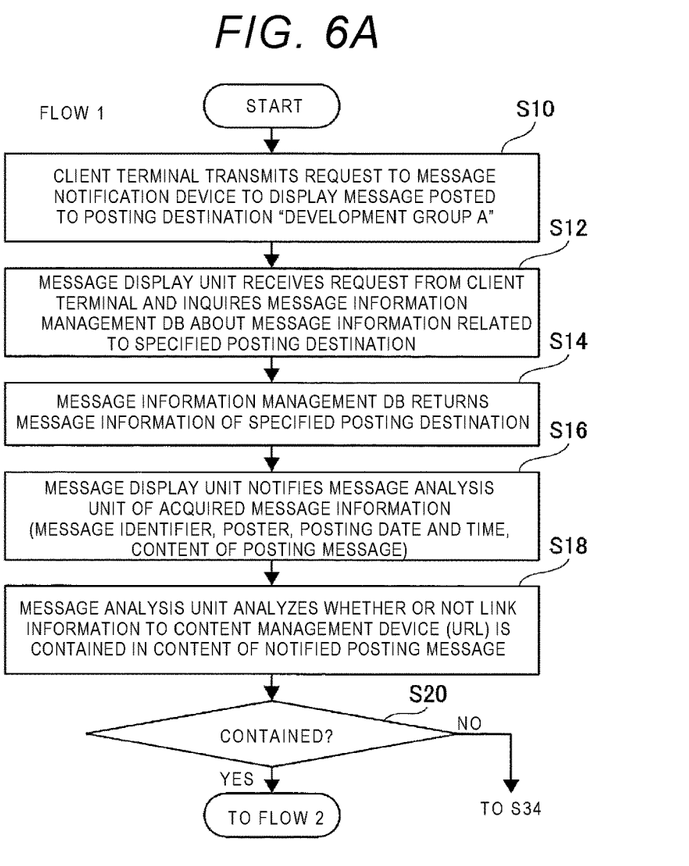
FIG. 6A is a flowchart showing a flow 1 in the content management system according to the exemplary embodiment of the present disclosure.
Figure 6B:
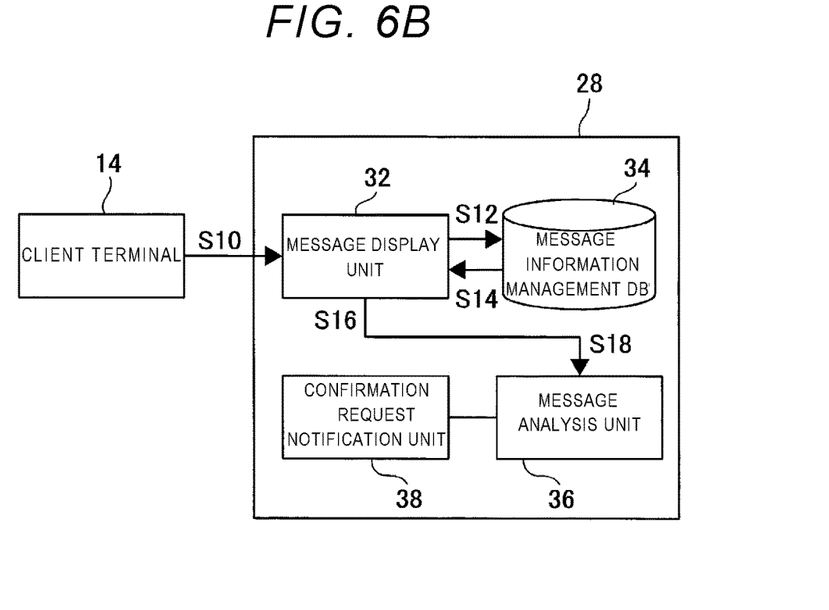
FIG. 6B is a block diagram showing the flow 1 in the content management system according to the exemplary embodiment of the present disclosure.

First, in step S10, the client terminal 14 transmits a request to the message notification device 28 to display a message posted to a development group A which is a posting destination.

In next step S12, the message display unit 32 receives the request from the client terminal 14, and inquires the message information management database 34 about information related to the development group A which is a specified posting destination.

Figure 7A:
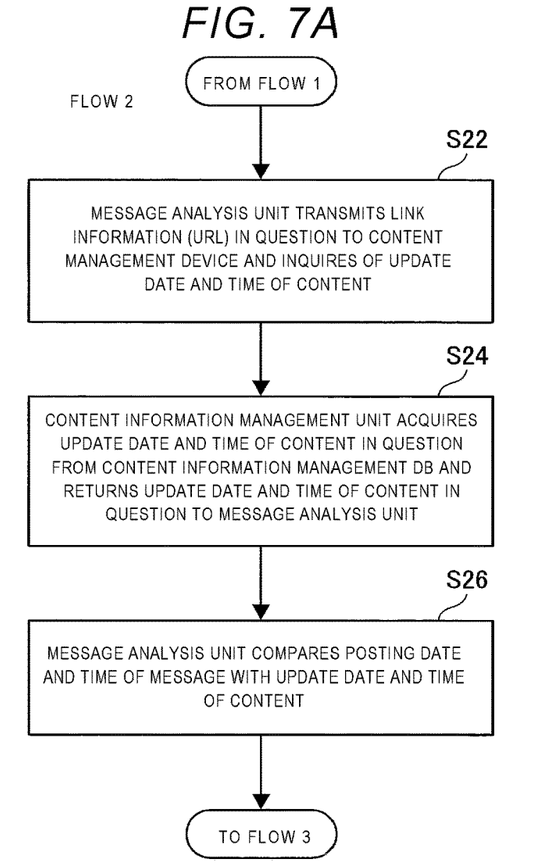
FIG. 7A is a flowchart showing a flow 2 in the content management system according to the exemplary embodiment of the present disclosure.
Figure 7B:
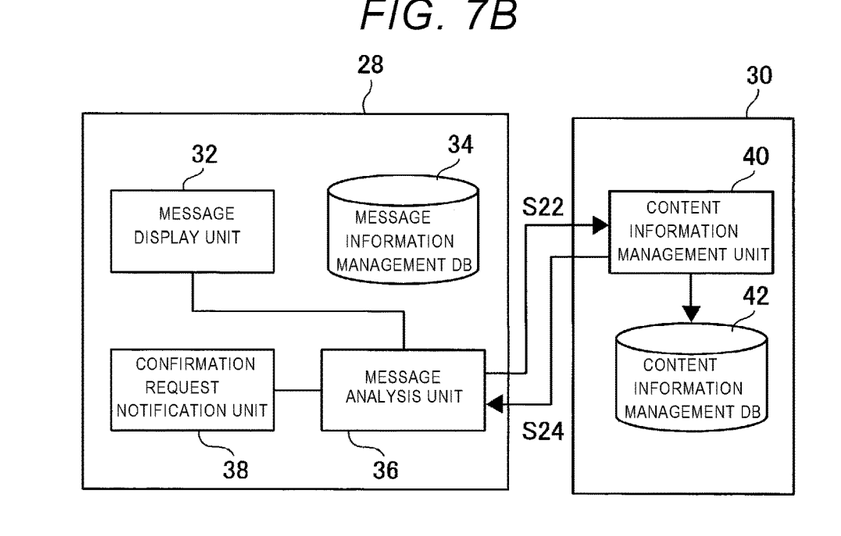
FIG. 7B is a block diagram showing the flow 2 in the content management system according to the exemplary embodiment of the present disclosure.
Figure 8A:
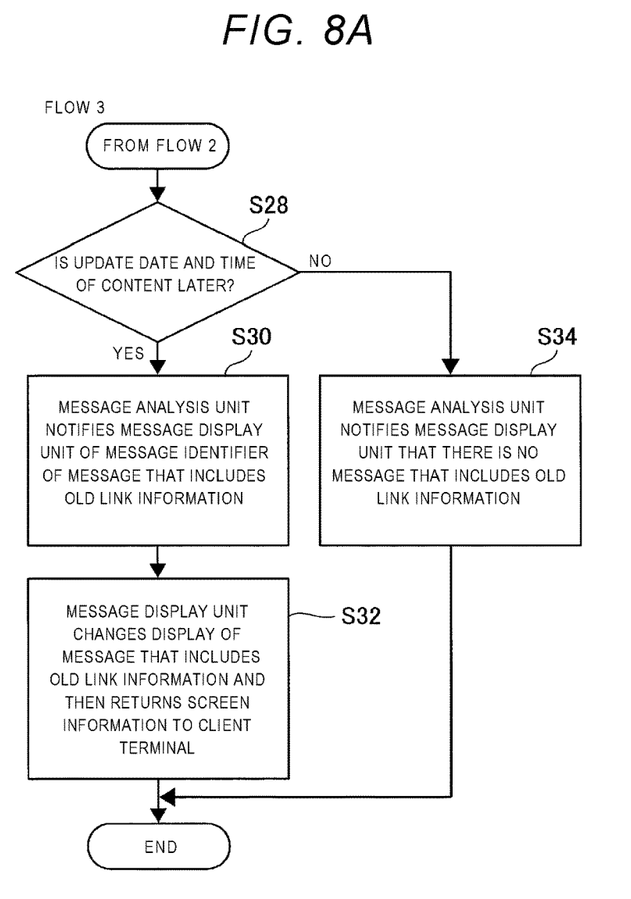
FIG. 8A is a flowchart showing a flow 3 in the content management system according to the exemplary embodiment of the present disclosure.
Figure 8B:
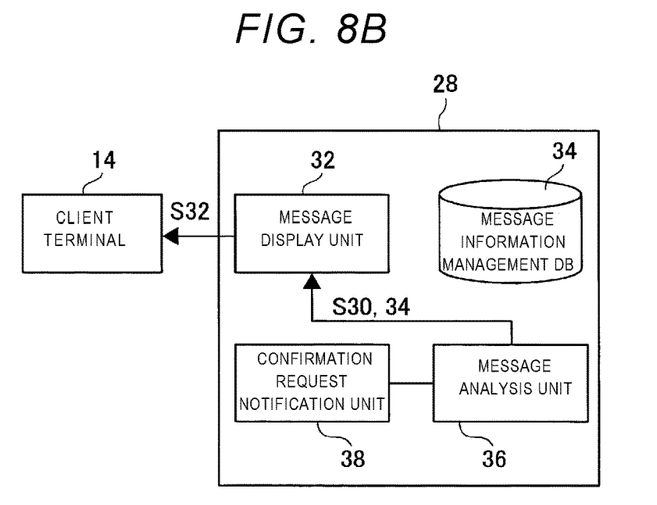
FIG. 8B is a block diagram showing the flow 3 in the content management system according to the exemplary embodiment of the present disclosure.

Next, in step S14, the message information management database 34 returns message information of the development group A which is the specified posting destination. The development group A includes messages having message identifiers M0000 and M0002 as shown in FIG. 4. The message information management database 34 returns, to the message display unit 32, the messages having the message identifiers M0000 and M0002 as message information 1 and message information 2 as shown in FIGS. 7A and 7B.

In next step S16, the message display unit 32 to which the message information returns the message information (that is, the message information 1 and the message information 2) notifies the message analysis unit 36 of the acquired message information (for example, a message identifier, a poster, a posting date and time, content of a message).

In next step S18, the message analysis unit 36 analyzes whether or not link information (for example, URL) to the content management device 30 as information for uniquely specifying content is contained in the content of the notified posting message. The analysis may be performed based on, for example, whether or not at least a part of the content of each notified posting message matches any of patterns of URLs of contents registered in the content management device 30.

In next step S20, the message analysis unit 36 determines whether or not the link information to the content management device 30 (for example, URL) is contained. Here, since https://xxx.co.jp/Contents/0000 is contained in the message having the message identifier M0000, it is determined as Yes, and the process proceeds to step S22.

In step S22, the message analysis unit 36 transmits, to the content management device 30, the link information (URL) in question to inquire of an update date and time of the content. Here, the update date and time of the content corresponding to https://xxx.co.jp/Contents/0000 contained in the message having the message identifier M0000 is inquired.

In next step S24, the content information management unit 40 acquires the update date and time of the content in question from the content information management database 42 and returns the update date and time of the content in question to the message analysis unit 36. Here, the content corresponding to https://xxx.co.jp/Contents/0000 is the content having the content identifier 0000, and the update date and time is Dec. 3, 2018, 11:30:00.

In next step S26, the message analysis unit 36 compares the posting date and time of the message with the update date and time of the content. Here, the posting date and time of the message having the message identifier M0000 is Dec. 1, 2018, 14:00:00, and the update date and time of the content having the content identifier 0000 is Dec. 3, 1028, 11:30:00.

In next step S28, the message analysis unit 36 determines whether or not the update date and time of the content is later than the posting date and time of the message. Here, since the update date and time Dec. 3, 2018, 11:30:00 of the content having the content identifier 0000 is later than the posting date and time Dec. 1, 2018, 14:00:00 of the message having the message identifier M0000, it is determined as Yes, and the process proceeds to step S30.

In step S30, the message analysis unit 36 notifies the message display unit 32 of a message identifier of the message that includes the old link information. Here, the message identifier is M0000.

In next step S32, the message analysis unit 36 causes the message display unit 32 to change a display of the message that includes the old link information and then returns screen information to the client terminal 14, and the process ends. Here, the display of the message having the message identifier M0000 is changed.

Meanwhile, if it is determined in step S20 that the link information is not contained in the message or if it is determined in step S28 that the posting date and time of the message is later than the update date and time of the content, the process proceeds to step S34.

In step S34, the message analysis unit 36 notifies the message display unit 32 that there is no message that includes old link information, and the process ends.

Figure 9A:
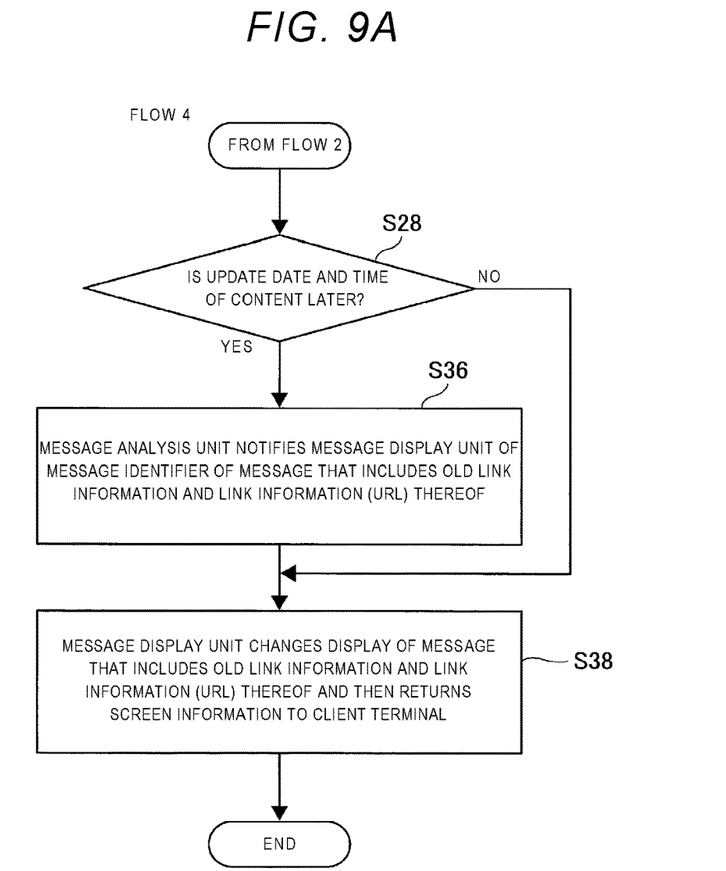
FIG. 9A is a flowchart showing a flow 4 in the content management system according to the exemplary embodiment of the present disclosure.
Figure 9B:
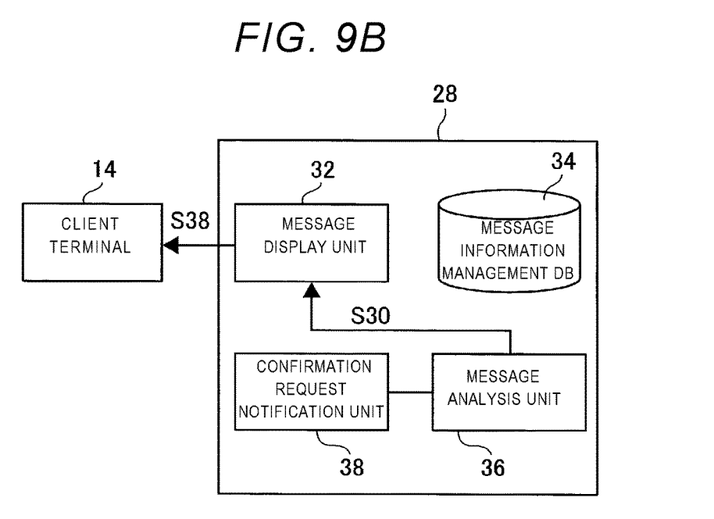
FIG. 9B is a block diagram showing the flow 4 in the content management system according to the exemplary embodiment of the present disclosure.

In another exemplary embodiment, as shown in FIGS. 9A and 9B, in step S36 instead of step S30, the message analysis unit 36 notifies the message display unit 32 of the message identifier of the message that includes the old link information and the link information (URL) thereof. In step S38 instead of step S32, the message display unit 32 may change the display of the message that includes the old link information and the link information (URL) thereof and return the screen information to the client terminal 14.

Figure 10A:
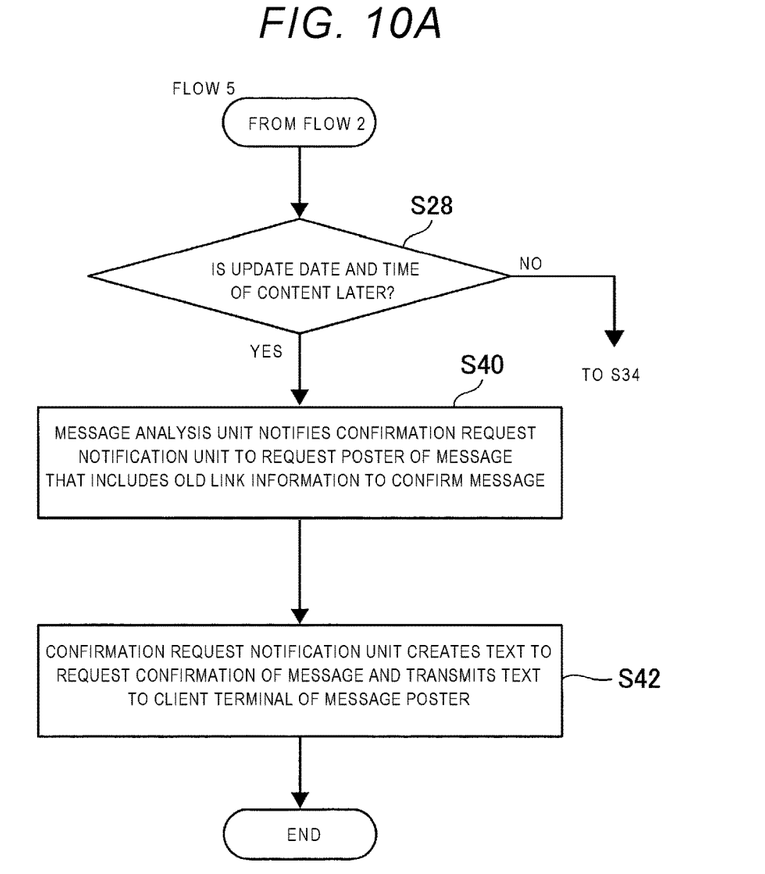
FIG. 10A is a flowchart showing a flow 5 in the content management system according to the exemplary embodiment of the present disclosure.
Figure 10B:
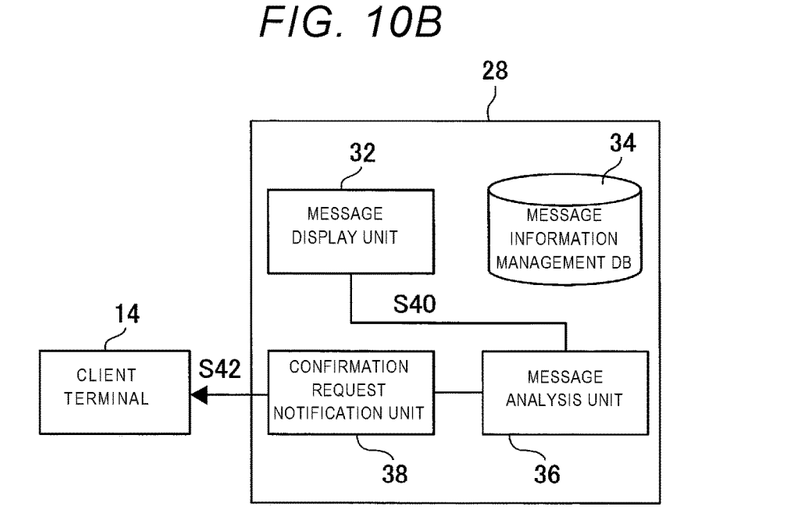
FIG. 10B is a block diagram showing the flow 5 in the content management system according to the exemplary embodiment of the present disclosure.

As shown in FIGS. 10A and 10B, if it is determined in step S28 that the update date and time of the content is later than the posting date and time of the message, the process proceeds to step S40. In step S40, the message analysis unit 36 notifies the confirmation request notification unit 38 to request a poster who has posted the message that includes the old link information, for confirmation of the message.

In next step S42, the confirmation request notification unit 38 creates a text to request confirmation of the message, and transmits the text to the client terminal 14 of the poster who has posted the message.

Figure 11:
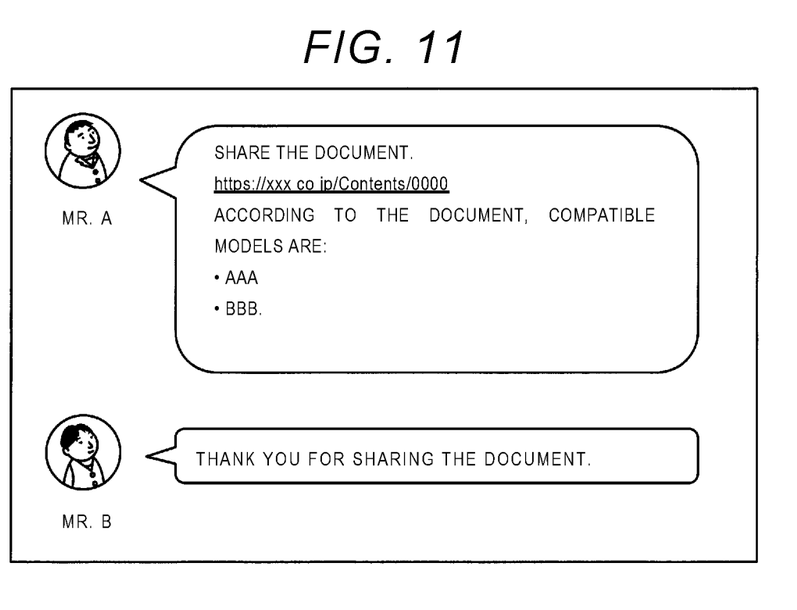
FIG. 11 is a screen view showing a message display when link information is contained in the content management system according to the exemplary embodiment of the present disclosure.
Figure 12:
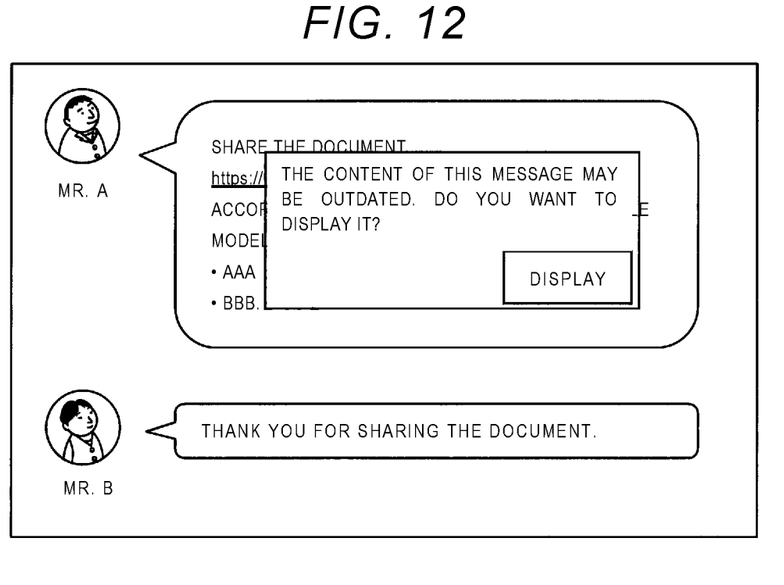
FIG. 12 is a screen view showing a state where the message display is hidden when the link information is contained in the content management system according to the exemplary embodiment of the present disclosure.

That is, as shown in FIG. 11, in a case of a normal posting screen, a message posted by a poster A is displayed as it is. However, if the link information (for example, URL) is contained in the message, as shown in FIG. 12, the message of the poster A is hidden by the text created by the confirmation request notification unit 38, for example, "the content of this message may be outdated. Do you want to display it?". If a "display" button is selected by the poster A in response, the message of the poster A is displayed.

When the content to be referenced is updated after being posted by a poster, wrong information may be given to another poster or participant. However, correct information can be given by prompting the poster to modify the previous message.

Figure 13:
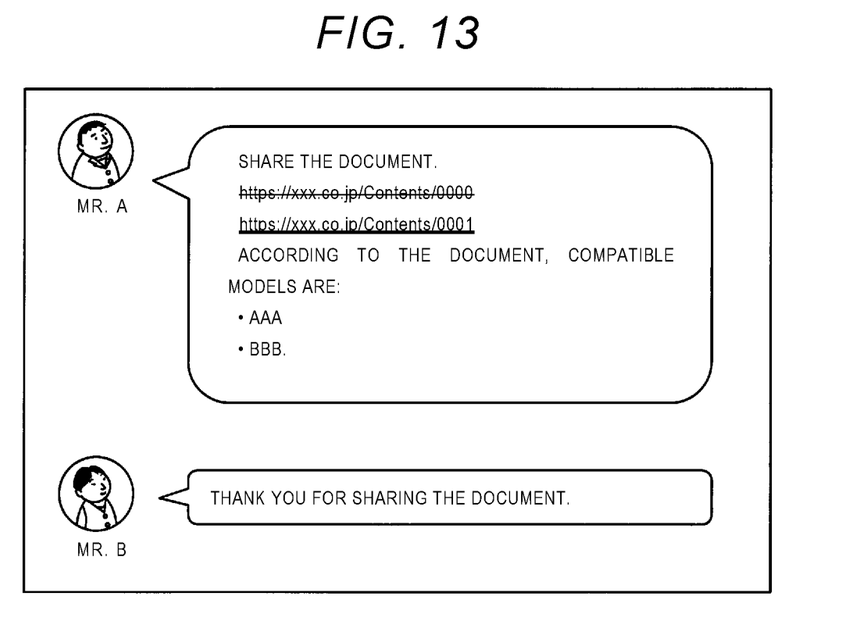
FIG. 13 is a screen view showing a message display when plural pieces of link information are contained in the content management system according to the exemplary embodiment of the present disclosure.

As shown in FIG. 13, when plural pieces of content link information are contained in one message, old link information may be, for example, struck out so as to be displayed separately from the link information without the old information.

Figure 14A:
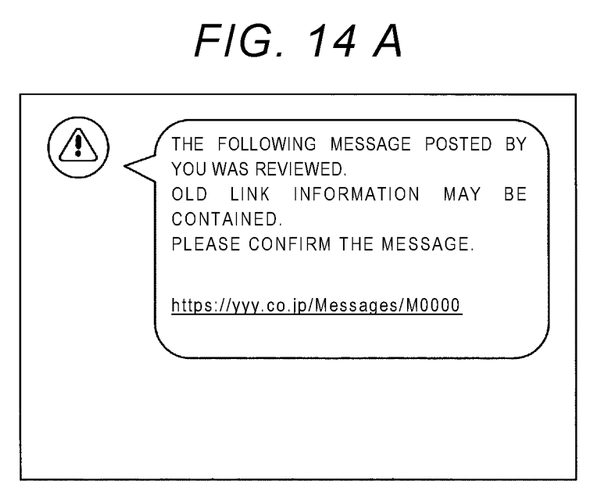
FIG. 14A is a screen view showing a notification example when the link information is contained in the content management system according to the exemplary embodiment of the present disclosure includes.
Figure 14B:
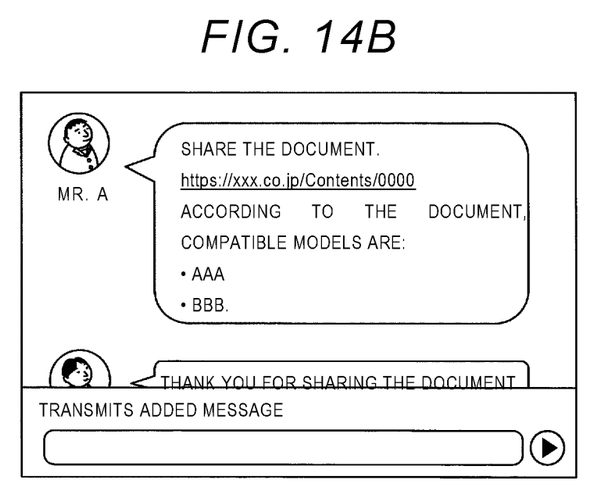
FIG. 14B is a screen view showing a state where an additional input form is displayed in the content management system according to the exemplary embodiment of the present disclosure.
Figure 15:
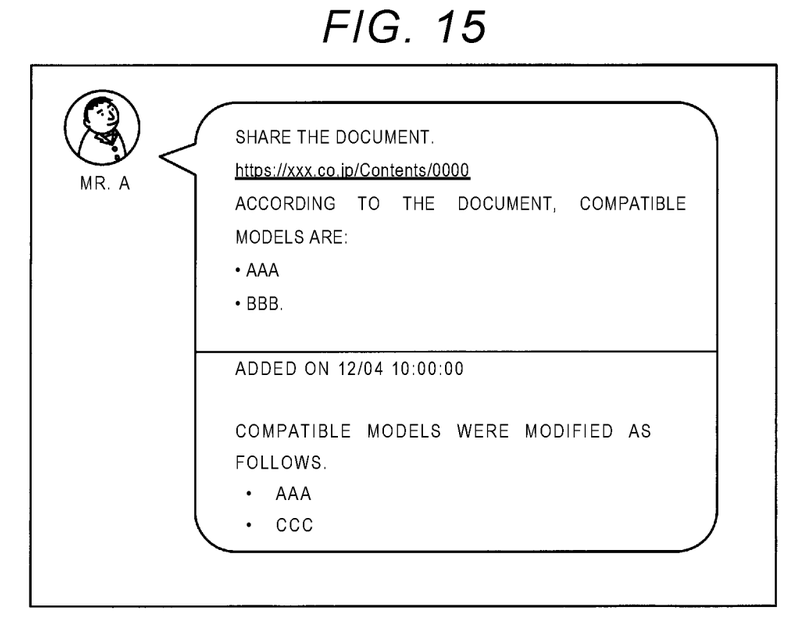
FIG. 15 is a screen view showing a state where a message is added in the content management system according to the exemplary embodiment of the present disclosure.

In this case, as shown in FIG. 14A, the confirmation request notification unit 38 may create a screen for requesting confirmation, and display an URL for confirmation. When the message poster clicks the URL on the screen, as shown in FIG. 14B, a corresponding message and an input form for adding a message are displayed. Further, when the message poster adds a message and transmits the additional message, as shown in FIG. 15, the previous message is updated to a message including the previous message and the added message.

In the exemplary embodiment, the URL is used to a thing for uniquely specifying content. It should be noted that the present disclosure is not limited thereto. For example, an ID (an abbreviation for identification, which refers to a code that specifies an object) may be allocated to each content (including updated content) to specify the each content. Information as to which content is updated may be separately managed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A message notification device comprising:
 a processor configured to
 receive messages from a plurality of users;
 acquire update information as to whether or not uniquely specified content is updated when information of the uniquely specified content is contained in a message; and notify a user of the plurality of users who has posted the message by displaying a notification within the message when the update information is acquired by the processor, wherein the notification obscures content of the message and indicates contents of the update information.

2. The message notification device according to claim 1, wherein the processor is configured to display inquiry information for inquiring the user whether or not to change the content of the message.

3. The message notification device according to claim 2, wherein if information indicating that the content of the message is to be changed is obtained from the user, the content of the message is changed.

4. The message notification device according to claim 2, wherein if information indicating that the content of the message is not to be changed is obtained from the user, the content of the message is not changed.

5. The message notification device according to claim 1, wherein when a plurality of pieces of information for uniquely specifying contents is contained in the message, the processor is configured to acquire updated content information and non-updated content information, and the processor is configured to notify the updated content information and the non-updated content information separately from each other.

6. A content management system comprising:
a content management device; and
a message device, wherein
the content management device is configured to manage at least an update date and time of content, and
the message device comprises a processor configured to receive messages from a plurality of users,
acquire update information as to whether or not uniquely specified content is updated from the content management device when information of the uniquely specified content is contained in a message, and
notify a user of the plurality of users who has posted the message by displaying a notification within the message when the update information is acquired by the processor, wherein
the notification obscures content of the message and indicates contents of the update information.

7. The content management system according to claim 6, wherein the processor is configured to compare a posting date and time of the message that includes the uniquely specified content with the update date and time of the uniquely specified content.

8. A non-transitory computer readable medium storing a program causing a computer to execute a message notification process, the message notification process comprising:
receiving messages from a plurality of users;
when information that uniquely specifies content is contained in a message, acquiring update information as to whether or not the uniquely specified content is updated; and
notifying a user of the plurality of users who has posted the message when the update information is acquired by displaying a notification within the message, wherein
the notification obscures content of the message and indicates contents of the update information.

9. The message notification device according to claim 1, wherein the displaying a notification in association with the message comprises displaying an indication in the message.

* * * * *